United States Patent
Long et al.

[15] 3,663,353
[45] May 16, 1972

[54] PLASTIC LAMINATE STRUCTURE CONSISTING OF A PLASTIC FILM LAMINATED TO A SUBSTRATE WITH A RESIN IMPREGNATED PAPER INTERMEDIATE LAYER

[72] Inventors: Jack D. Long, Cleveland, Ohio; David Richards, Lunenburg, Mass.

[73] Assignee: Fitchburg Paper Company, Fitchburg, Mass.

[22] Filed: June 1, 1970

[21] Appl. No.: 41,740

Related U.S. Application Data

[63] Continuation of Ser. No. 602,797, Dec. 19, 1966, abandoned.

[52] U.S. Cl. ............... 161/184, 161/186, 161/189, 161/207, 161/208, 161/209, 161/214, 161/215, 161/232, 161/233, 161/248, 161/263
[51] Int. Cl. ............... B32b 15/08, B32b 27/08, B32b 27/30
[58] Field of Search ............... 161/165, 182, 184, 229, 248, 161/249, 250, 263, 189, 232, 251, 186, 413, 214, 215, 207, 208, 209

[56] References Cited

UNITED STATES PATENTS

| | | | |
|---|---|---|---|
| 2,571,962 | 10/1951 | Smith et al. | 156/277 |
| 2,696,452 | 12/1954 | Trepp | 156/240 |
| 3,218,225 | 11/1965 | Petropoulos | 161/248 |
| 3,294,619 | 12/1966 | Noland | 161/165 |
| 3,340,137 | 9/1967 | Kamal | 161/184 |
| 3,403,071 | 9/1968 | Perry et al. | 161/189 |
| 3,418,189 | 12/1968 | Grosheim | 156/277 |
| 3,488,249 | 1/1970 | Wolinski | 161/189 X |

*Primary Examiner*—John T. Goolkasian
*Assistant Examiner*—D. J. Fritsch
*Attorney*—Arthur T. Groeninger, Norman Friedman, Stephen E. Feldman, Elmer W. Edwards and Morris I. Pollack

[57] ABSTRACT

Laminated structures are disclosed wherein a reverse printed film of plastic such as polyvinyl chloride, Tedlar or polytetrafluoroethylene is joined to a substrate by means of a thermoset resin impregnated paper layer.

1 Claims, 1 Drawing Figure

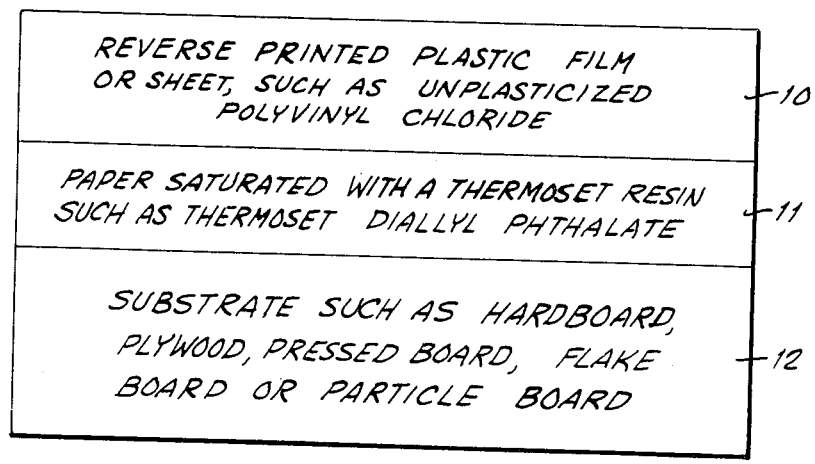

Patented May 16, 1972 3,663,353

| REVERSE PRINTED PLASTIC FILM OR SHEET, SUCH AS UNPLASTICIZED POLYVINYL CHLORIDE — 10 |
| PAPER SATURATED WITH A THERMOSET RESIN SUCH AS THERMOSET DIALLYL PHTHALATE — 11 |
| SUBSTRATE SUCH AS HARDBOARD, PLYWOOD, PRESSED BOARD, FLAKE BOARD OR PARTICLE BOARD — 12 |

INVENTORS
DAVID RICHARDS
BY JACK D. LONG

*Arthur T. Browninge*

ATTORNEY

3,663,353

PLASTIC LAMINATE STRUCTURE CONSISTING OF A PLASTIC FILM LAMINATED TO A SUBSTRATE WITH A RESIN IMPREGNATED PAPER INTERMEDIATE LAYER

This Application is a continuation of copending application, Ser. No. 602,797 filed Dec. 19, 1966 and now abandoned.

PLASTIC LAMINATE STRUCTURE

This invention relates to laminate structures, particularly plastic laminate structures. More specifically, this invention is directed to a laminate structure containing as one component or layer thereof a plasticized or unplasticized film of a polymeric material or plastic, such as polyvinyl chloride and Tedlar (a polyvinyl fluoride).

In accordance with one embodiment this invention is directed to a method of preparing a plastic laminate structure containing a film of unplasticized or plasticized polymeric material, such as polyvinyl chloride. In accordance with another embodiment this invention is directed to a method of joining or incorporating a film or sheet of plastic, such as polyvinyl chloride, in a laminate structure. In accordance with yet another embodiment this invention is directed to a unitary laminate structure containing a film or sheet of polymeric material or plastic joined or united to a layer containing thermoset resin.

Plastic materials are useful materials for construction. For example, plastics, such as Tedlar and polyvinyl chloride, are desirable materials to be incorporated in laminate structures, particularly as a top layer, since these materials are wear resistant, stain resistant, weather resistant and are capable of being treated to yield an attractive appearance. Unfortunately, however, these materials are relatively difficult to incorporate in laminate structures. In the past it has been necessary to apply an adhesive to a surface of the plastic film or sheet before it could be incorporated in a laminate structure. The operation involving the application of an adhesive layer to a plastic film or sheet adds to the expense of the resulting produced laminate structure and tends, in some instances, to interfere with the attractiveness of the finished product. Also, equipment for applying adhesive to the plastic film or sheet, followed by the incorporation of the resulting adhesive coated film or sheet in a laminate structure, gives rise to limitations with respect to the size and strength and other properties of the resulting produced laminate structure.

It is an object of this invention to provide a laminate structure including a film or sheet of plastic, such as Tedlar and polyvinyl chloride, as a component or layer of the laminate structure without at the same time including or incorporating an adhesive layer or coating for the plastic component or layer of the laminate structure.

It is another object of this invention to provide a plastic laminate structure containing as an exposed or top layer thereof a film or sheet of plastic laminated or joined in a unitary structure with a thermoset resin-impregnated intermediate layer.

How these and other objects of this invention are achieved will become apparent in the light of the accompanying disclosure made with reference to the accompanying drawing wherein there is schematically illustrated a plastic laminate structure in accordance with this invention. In at least one embodiment of the practices of this invention at least one of the foregoing objects will be achieved.

A plastic laminate structure in accordance with one embodiment of this invention comprises a film or sheet of plastic or polymeric material, such as Tedlar and unplasticized polyvinyl chloride, and a substrate wherein the film of plastic or polymeric material is joined to said substrate by means of an intermediate layer of porous and/or fibrous material, such as paper, e.g. alpha-cellulose paper and kraft paper, impregnated with a thermoset resin, the thermoset resin in said intermediate layer serving to join said film or sheet of plastic to said intermediate layer and serving to join said substrate to said intermediate layer, thereby providing an integral plastic laminate structure.

Referring now to the drawing, there is illustrated therein an example of a plastic laminate structure in accordance with this invention. As illustrated in the drawing, an exposed or top layer 10 of the plastic laminate structure comprises reverse printed unplasticized polyvinyl chloride which is joined or united to an intermediate porous and/or fibrous layer 11, such as paper, e.g. kraft paper, which is saturated with a thermoset resin, such as thermoset epoxy, phenolic, or melamine resin. Intermediate layer 11 is also joined or united to substrate 12, likewise by means of the thermoset resin. Substrate 12 may comprise substantially any substrate, such as a substantially rigid substrate, e.g. a metal or composite substrate, hardboard, plywood, pressed board, flake board and particle board.

The top plastic layer 10 of the plastic laminate structure is desirably, in accordance with one embodiment of the invention, made up of unplasticized polyvinyl chloride. Other synthetic resin plastic or polymeric materials, plasticized or unplasticized, are also useful, such as Tedlar and a polytetrafluoroethylene manufactured by E.I. duPont de Nemours & Co. Other plastic and polymeric materials, and paper made up of cellulosic and/or synthetic fibers, depending upon the physical properties desired in the finished product, are also useful.

As the intermediate layer making up the plastic laminate structure in accordance with this invention substantially any porous and/or fibrous material may be employed. Particularly suitable is paper, e.g. kraft paper and alpha-cellulose paper and other papers useful as barrier or overlay sheets in laminate manufactures.

The thermoset resin with which the intermediate layer 11 is impregnated may be derived from substantially any thermosetting resin. Thermosetting resins useful in the manufacture of plastic laminate structures in accordance with this invention include thermosetting phenolic resins, e.g. phenol formaldehyde resins, the thermosetting aminotriazine-aldehyde resins, such as melamine formaldehyde resins, thermosetting polyester resins, thermosetting epoxy resins, thermosetting silicone resins, diallyl phthalate and the like.

Various materials may be employed as substrate 12 in accordance with this invention. Particularly useful are the substantially rigid substrates, such as hardboard, plywood and particle board. Metal substrates, such as aluminum and steel, and suitably treated paper substrates may also be employed.

In the preparation of a plastic laminate structure in accordance with this invention the intermediate layer 11, such as kraft paper, is substantially saturated with a thermosetting resin. Desirably, the saturated paper should contain at least about 25 percent by weight resin and, after removal of excess resin, is dried before the resin is partially cured.

There is then applied to the intermediate layer, now containing partially cured thermosetting resin, the top layer or film 10, such as a film or sheet of unplasticized polyvinyl chloride having a thickness in the range from about 0.5 mil to about 15 mils, more or less, usually a thickness in the range 2–10 mils. The resulting composite is then applied or suitably joined to the substrate and the resulting assembly then subjected to conditions effective to fully cure the partially cured resin. Upon curing the resulting thermoset resin serves to join or unite the top layer or film of unplasticized polyvinyl chloride to the intermediate paper layer and also serves to join or unite the substrate to the intermediate paper layer.

Suitable conditions for curing the partially cured thermosetting resin are well known and, by way of example, include a pressure in the range from about 800 to about 1,500 psi, a temperature in the range from about 260° to about 300° F. Higher and lower pressures and higher and lower temperatures in combination with longer and shorter cured periods may be employed depending upon the resin employed and other factors.

Generally, an overall commercial laminating-curing operation in accordance with this invention requires a period of time in the range from about 25 minutes to about 1 hour, more or less. In the laminating-curing operation the temperature employed is usually the controlling factor. Usually in a commercial laminating, curing operation one third of the time is required to get the laminating press up to temperature, another one third for the curing operation and the remaining one third for cooling the press and removing the resulting plastic laminate structure. By way of example, the composite laminate of plastic, partially cured intermediate layer and substrate would be heated under pressure at a temperature in the range 260°–300° F. for about 10–25 minutes and then cooled to about room temperature or a temperature in the range 100°–160° F. over a period of time of about 5–15 minutes and then released from the laminating press.

The practices of this invention are particularly useful in connection with the manufacture of high or low pressure laminates. At present, the manufacturer of high or low pressure laminates cannot handle the lamination of plastic films, such as unplasticized polyvinyl film, to a substrate, such as hardboard, plywood, particle board and the like, for vertical surfacing to complement a horizontal surfacing product because present techniques require the roll application of adhesive for joining the plastic film.

In accordance with another embodiment of the practice of this invention, there is produced a laminate structure made up of a plastic film, such as unplasticized polyvinyl film, applied or joined to paper, e.g. kraft paper, impregnated with cured thermosetting resin. This two layer laminate structure is prepared by laminating a film of plastic, such as Tedlar, polyvinyl chloride and the like to paper impregnated with a thermosetting resin, uncured or partially cured, followed by curing to produce the laminate structure desired.

The practice of this invention, as indicated hereinabove, permits the use of a decorative plastic film or sheet top coat or layer wherein decorative features are imparted, such as by reverse printing, to the plastic film and applying or joining the decorated surface of the plastic film directly to the intermediate layer saturated with the partially cured thermosetting resin.

In accordance with another embodiment of the practices of this invention there may be included as the intermediate layer, see layer 11 of the drawing, one or more resin impregnated fibrous or paper sheets, including a barrier sheet. The resin content of the intermediate layer or layers is usually in the range 25–70 percent by weight resin.

In accordance with yet another embodiment of the practices of this invention there may be produced a five layer laminate structure comprising a plastic top layer, a paper or intermediate layer impregnated with thermoset resin, a substrate or rigid core material, such as plywood, hardboard, particle board or metal, another intermediate layer, such as paper, impregnated with thermoset resin and a bottom layer or film of plastic.

As will be apparent to those skilled in the art in the light of the foregoing disclosure many modifications, alterations and substitutions are possible in the practice of this invention without departing from the spirit or scope thereof.

We claim:

1. A plastic laminate structure consisting essentially of a film of reverse printed polyvinylchloride and a substrate, said film being joined to said substrate by means of a layer of paper impregnated with a thermoset resin; the resin content of said layer being between 25 – 70 percent by weight, said substrate being selected from the group consisting of metal, hardboard, plywood, pressed board, flake board and particle board, said film of plastic has a thickness in the range from about 0.5 mil to about 15 mils, said thermoset resin is selected from the group consisting of a thermoset phenolic resin, a thermoset melamine resin, a thermoset epoxy resin, a thermoset silicone resin, a thermoset polyester resin and thermoset diallyl phthalate.

* * * * *